US012437862B2

United States Patent
Yamaga et al.

(10) Patent No.: US 12,437,862 B2
(45) Date of Patent: Oct. 7, 2025

(54) RARE INSTANCE ANALYTICS FOR DIVERSION DETECTION

(71) Applicant: CareFusion 303, Inc., San Diego, CA (US)

(72) Inventors: Cynthia Yamaga, Oceanside, CA (US); Hien-Hoa Vu, Pearland, TX (US); Abhikesh Nag, San Diego, CA (US); Satya Varaprasad Allumallu, San Diego, CA (US); Dennis Tribble, Ormond Beach, FL (US)

(73) Assignee: CareFusion 303, Inc., San Diego, CA (US)

( * ) Notice: Subject to any disclaimer, the term of this patent is extended or adjusted under 35 U.S.C. 154(b) by 525 days.

(21) Appl. No.: 17/763,622

(22) PCT Filed: Sep. 25, 2020

(86) PCT No.: PCT/US2020/052824
§ 371 (c)(1),
(2) Date: Mar. 24, 2022

(87) PCT Pub. No.: WO2021/062228
PCT Pub. Date: Apr. 1, 2021

(65) Prior Publication Data
US 2022/0375581 A1    Nov. 24, 2022

Related U.S. Application Data

(60) Provisional application No. 62/907,295, filed on Sep. 27, 2019.

(51) Int. Cl.
*G16H 40/20* (2018.01)
*G16H 20/10* (2018.01)

(52) U.S. Cl.
CPC ............. *G16H 40/20* (2018.01); *G16H 20/10* (2018.01)

(58) Field of Classification Search
CPC ............................... G16H 40/20; G16H 20/10
See application file for complete search history.

(56) References Cited

U.S. PATENT DOCUMENTS

| 4,551,133 A | 11/1985 | Zegers de Beyl et al. |
| 4,693,804 A | 9/1987 | Serwer |

(Continued)

FOREIGN PATENT DOCUMENTS

| AU | 2017 279 693 A1 | 1/2018 |
| AU | 2018335288 B2 | 8/2023 |

(Continued)

OTHER PUBLICATIONS

Benjamin, X.C. et al. (2012). "Visual identification of medicine boxes using features matching." *IEEE International Conference on Virtual Environments Human-Computer Interfaces and Measurement Systems (VECIMS) Proceedings*, 43-47. Doi: 10.1109/VECIMS.2012.6273190.

(Continued)

*Primary Examiner* — Evangeline Barr
(74) *Attorney, Agent, or Firm* — Mintz Levin Cohn Ferris Glovsky and Popeo, P.C.

(57) ABSTRACT

A method for detecting diversion may include identifying an activity pattern associated with a clinician as being an infrequent activity pattern that occurs below a threshold frequency. Whether the infrequent activity pattern corresponds to an anomalous behavior may be determined based at least on one or more data models. The infrequent activity pattern may include a series of transaction records, which may be matched to the reference transaction values included in each of the one or more data models. An investigative (Continued)

workflow may be triggered in response to the infrequent activity pattern being determined to correspond to the anomalous behavior. Related methods and articles of manufacture are also disclosed.

20 Claims, 5 Drawing Sheets

(56) References Cited

U.S. PATENT DOCUMENTS

| | | |
|---|---|---|
| 5,945,651 A | 8/1999 | Chorosinski et al. |
| 5,961,036 A | 10/1999 | Michael et al. |
| 5,991,731 A | 11/1999 | Colon et al. |
| 6,113,578 A | 9/2000 | Brown |
| 6,650,964 B2 | 11/2003 | Spano, Jr. et al. |
| 6,671,579 B2 | 12/2003 | Spano, Jr. et al. |
| 6,842,736 B1 | 1/2005 | Brzozowski |
| 6,868,344 B1 | 3/2005 | Nelson |
| 7,119,689 B2 | 10/2006 | Mallett et al. |
| 7,184,897 B2 | 2/2007 | Nelson |
| 7,275,645 B2 | 10/2007 | Mallett et al. |
| 7,303,081 B2 | 12/2007 | Mallett et al. |
| 7,311,207 B2 | 12/2007 | Mallett et al. |
| 7,318,529 B2 | 1/2008 | Mallett et al. |
| 7,562,025 B2 | 7/2009 | Mallett et al. |
| 7,693,603 B2 | 4/2010 | Higham |
| 8,147,479 B1 | 4/2012 | Wach et al. |
| 8,195,328 B2 | 6/2012 | Mallett et al. |
| 8,280,550 B2 | 10/2012 | Levy et al. |
| 8,319,669 B2 | 11/2012 | Weller |
| 8,357,114 B2 | 1/2013 | Poutiatine et al. |
| 8,595,021 B2 | 11/2013 | Mallett et al. |
| 8,606,596 B1 | 12/2013 | Bochenko et al. |
| 8,725,532 B1 | 5/2014 | Ringold |
| 8,738,177 B2 | 5/2014 | van Ooyen et al. |
| 8,768,724 B2 | 7/2014 | Whiddon et al. |
| 8,905,964 B2 | 12/2014 | Poutiatine et al. |
| 9,056,165 B2 | 6/2015 | Steil et al. |
| 9,158,892 B2 | 10/2015 | Levy et al. |
| 9,202,052 B1 | 12/2015 | Fang et al. |
| 9,227,025 B2 | 1/2016 | Butterfield et al. |
| 9,354,178 B2 | 5/2016 | Lee |
| 9,427,520 B2 | 8/2016 | Batch et al. |
| 9,456,958 B2 | 10/2016 | Reddy et al. |
| 9,523,635 B2 | 12/2016 | Tilden |
| 9,636,273 B1 | 5/2017 | Harris |
| 9,752,935 B2 | 9/2017 | Marquardt et al. |
| 9,785,744 B2 | 10/2017 | Johnson et al. |
| 9,796,526 B2 | 10/2017 | Smith et al. |
| 9,817,850 B2 | 11/2017 | Dubbels et al. |
| 9,836,485 B2 | 12/2017 | Dubbels et al. |
| 9,842,196 B2 | 12/2017 | Utech et al. |
| 9,881,129 B1 | 1/2018 | Cave |
| 9,958,324 B1 | 5/2018 | Marquardt et al. |
| 10,032,344 B2 | 7/2018 | Nelson et al. |
| 10,101,269 B2 | 10/2018 | Judge et al. |
| 10,187,288 B2 | 1/2019 | Parker et al. |
| 10,209,176 B2 | 2/2019 | Proskurowski et al. |
| 10,241,038 B2 | 3/2019 | Nishimura et al. |
| 10,249,153 B2 | 4/2019 | Nelson et al. |
| 10,309,832 B2 | 6/2019 | Marquardt et al. |
| 10,345,242 B2 | 7/2019 | Zhao et al. |
| 10,569,015 B2 | 2/2020 | Estes |
| 10,580,525 B2 | 3/2020 | Adams et al. |
| 10,832,207 B2 | 11/2020 | Vahlberg et al. |
| 11,037,666 B1 | 6/2021 | Benoit et al. |
| 11,116,892 B2 | 9/2021 | Brady et al. |
| 11,147,914 B2 | 10/2021 | Estes |
| 11,222,721 B2 | 1/2022 | Nag et al. |
| 11,481,739 B1 | 10/2022 | McKinzie |
| 2003/0158751 A1 | 8/2003 | Suresh et al. |
| 2003/0167190 A1 | 9/2003 | Rincavage et al. |
| 2005/0277873 A1 | 12/2005 | Stewart et al. |
| 2006/0064053 A1 | 3/2006 | Bollish et al. |
| 2007/0260487 A1 | 11/2007 | Bartfeld et al. |
| 2008/0059226 A1 | 3/2008 | Melker et al. |
| 2008/0082360 A1 | 4/2008 | Bailey et al. |
| 2008/0140715 A1 | 6/2008 | Hakos |
| 2008/0243055 A1 | 10/2008 | Fathallah et al. |
| 2008/0288430 A1 | 11/2008 | Friedlander et al. |
| 2008/0306796 A1 | 12/2008 | Zimmerman et al. |
| 2008/0319795 A1 | 12/2008 | Poteet et al. |
| 2009/0083231 A1 | 3/2009 | Eberholst et al. |
| 2009/0160646 A1 | 6/2009 | Mackenzie et al. |
| 2010/0169063 A1 | 7/2010 | Yudkovitch et al. |
| 2010/0213250 A1 | 8/2010 | Mallett et al. |
| 2010/0271218 A1 | 10/2010 | Hoag et al. |
| 2011/0016110 A1 | 1/2011 | Egi et al. |
| 2011/0082440 A1 | 4/2011 | Kimmo et al. |
| 2011/0161108 A1 | 6/2011 | Miller et al. |
| 2012/0173440 A1 | 7/2012 | Dehlinger et al. |
| 2012/0226447 A1 | 9/2012 | Nelson et al. |
| 2012/0265336 A1 | 10/2012 | Mallett et al. |
| 2012/0305132 A1 | 12/2012 | Maness |
| 2012/0325330 A1 | 12/2012 | Prince et al. |
| 2013/0002429 A1 | 1/2013 | Johnson |
| 2013/0018356 A1 | 1/2013 | Prince et al. |
| 2013/0070090 A1 | 3/2013 | Bufalini et al. |
| 2013/0144254 A1 | 6/2013 | Amirouche et al. |
| 2013/0253291 A1 | 9/2013 | Dixon et al. |
| 2013/0253700 A1 | 9/2013 | Carson et al. |
| 2013/0262138 A1 | 10/2013 | Jaskela et al. |
| 2013/0282392 A1 | 10/2013 | Wurm |
| 2013/0325727 A1 | 12/2013 | MacDonell et al. |
| 2014/0074284 A1 | 3/2014 | Czaplewski et al. |
| 2014/0081652 A1 | 3/2014 | Klindworth |
| 2014/0149131 A1 | 5/2014 | Bear et al. |
| 2014/0249776 A1 | 9/2014 | King et al. |
| 2014/0277707 A1 | 9/2014 | Akdogan et al. |
| 2014/0375324 A1 | 12/2014 | Matsiev et al. |
| 2015/0038898 A1 | 2/2015 | Palmer et al. |
| 2015/0061832 A1 | 3/2015 | Pavlovic et al. |
| 2015/0081324 A1 | 3/2015 | Adjaoute |
| 2015/0109437 A1 | 4/2015 | Yang et al. |
| 2015/0161558 A1 | 6/2015 | Gitchell et al. |
| 2015/0221086 A1 | 8/2015 | Bertram |
| 2015/0272825 A1 | 10/2015 | Lim et al. |
| 2015/0286783 A1 | 10/2015 | Kumar et al. |
| 2015/0294079 A1 | 10/2015 | Bergougnan |
| 2015/0323369 A1 | 11/2015 | Marquardt |
| 2015/0339456 A1 | 11/2015 | Sprintz |
| 2015/0362350 A1 | 12/2015 | Miller et al. |
| 2016/0034274 A1 | 2/2016 | Diao et al. |
| 2016/0062371 A1 | 3/2016 | Davidian et al. |
| 2016/0117478 A1 | 4/2016 | Hanina et al. |
| 2016/0161705 A1 | 6/2016 | Marquardt et al. |
| 2016/0166766 A1 | 6/2016 | Schuster et al. |
| 2016/0259904 A1 | 9/2016 | Wilson |
| 2016/0259911 A1 | 9/2016 | Koester |
| 2016/0283691 A1 | 9/2016 | Ali |
| 2016/0346469 A1 | 12/2016 | Shubinsky et al. |
| 2017/0017760 A1 | 1/2017 | Freese et al. |
| 2017/0032102 A1 | 2/2017 | Skoda |
| 2017/0076065 A1 | 3/2017 | Darr et al. |
| 2017/0083681 A1 | 3/2017 | Sprintz et al. |
| 2017/0103203 A1 | 4/2017 | Sharma et al. |
| 2017/0108480 A1 | 4/2017 | Clark et al. |
| 2017/0109480 A1* | 4/2017 | Vahlberg ............... G07F 9/002 |
| 2017/0109497 A1* | 4/2017 | Tribble ............... G16H 70/40 |
| 2017/0120035 A1 | 5/2017 | Butterfield et al. |
| 2017/0199983 A1 | 7/2017 | Cano et al. |
| 2018/0028408 A1 | 2/2018 | Li et al. |
| 2018/0039736 A1 | 2/2018 | Williams |
| 2018/0046651 A1 | 2/2018 | Dubbels et al. |
| 2018/0157803 A1 | 6/2018 | Mirov |
| 2018/0165417 A1 | 6/2018 | Hall et al. |
| 2018/0192942 A1 | 7/2018 | Clark et al. |
| 2018/0203978 A1 | 7/2018 | Basu et al. |
| 2018/0231415 A1 | 8/2018 | Marquardt et al. |
| 2018/0247703 A1* | 8/2018 | D'Amato ............... G16H 10/60 |
| 2018/0259446 A1 | 9/2018 | Coffey et al. |
| 2018/0299375 A1 | 10/2018 | Young et al. |
| 2018/0330824 A1 | 11/2018 | Athey et al. |

(56) References Cited

U.S. PATENT DOCUMENTS

| | | |
|---|---|---|
| 2018/0365385 A1 | 12/2018 | Cooney et al. |
| 2018/0365386 A1 | 12/2018 | Vanderveen |
| 2019/0088354 A1* | 3/2019 | Yanowitz ........... G06K 19/0723 |
| 2019/0117883 A1 | 4/2019 | Abrams et al. |
| 2019/0124118 A1 | 4/2019 | Swafford |
| 2019/0139638 A1 | 5/2019 | Keefe et al. |
| 2019/0180862 A1 | 6/2019 | Wisser et al. |
| 2019/0244699 A1 | 8/2019 | Loebig et al. |
| 2019/0247703 A1 | 8/2019 | Welde et al. |
| 2019/0341142 A1 | 11/2019 | Nag et al. |
| 2019/0355461 A1 | 11/2019 | Kumar et al. |
| 2020/0085686 A1 | 3/2020 | Aliakbarian et al. |
| 2020/0098474 A1 | 3/2020 | Vanderveen |
| 2020/0219611 A1 | 7/2020 | Nag et al. |
| 2020/0222627 A1 | 7/2020 | Guerra et al. |
| 2020/0230316 A1 | 7/2020 | Guerra et al. |
| 2020/0312442 A1 | 10/2020 | Hairr et al. |
| 2020/0402632 A1 | 12/2020 | van Schelven et al. |
| 2021/0005324 A1 | 1/2021 | Bostic et al. |
| 2021/0027259 A1 | 1/2021 | Burgess et al. |
| 2021/0133201 A1 | 5/2021 | Tribble et al. |
| 2021/0308385 A1 | 10/2021 | Nisha et al. |
| 2022/0005574 A1 | 1/2022 | Kühn |
| 2022/0062964 A1 | 3/2022 | VanDerWoude et al. |
| 2022/0093239 A1 | 3/2022 | Nag et al. |
| 2022/0254470 A1 | 8/2022 | Lafauci et al. |

FOREIGN PATENT DOCUMENTS

| | | |
|---|---|---|
| CA | 2561239 C | 2/2010 |
| CA | 2 636 115 C | 6/2014 |
| CA | 2 848 274 C | 9/2016 |
| CN | 106687960 A | 5/2017 |
| CN | 110265108 A | 9/2019 |
| EP | 1 973 593 B1 | 4/2013 |
| EP | 1 593 076 B1 | 10/2019 |
| JP | 2007-304654 A | 11/2007 |
| JP | 2016-517077 A | 6/2016 |
| JP | 2018-181340 A | 11/2018 |
| KR | 10-2014-0129141 A | 11/2014 |
| WO | WO-2006/034367 A2 | 3/2006 |
| WO | WO-2010/058796 A1 | 5/2010 |
| WO | WO-2011/014517 A1 | 2/2011 |
| WO | WO-2011/035277 A1 | 3/2011 |
| WO | WO-2011/039676 A2 | 4/2011 |
| WO | WO-2014/055925 A1 | 4/2014 |
| WO | WO-2015/187682 A1 | 12/2015 |
| WO | WO-2019/028004 A1 | 2/2019 |
| WO | WO-2019/031331 A1 | 2/2019 |
| WO | WO-2020/163465 A1 | 8/2020 |
| WO | WO-2020/206154 A1 | 10/2020 |
| WO | WO-2020/251962 A1 | 12/2020 |

OTHER PUBLICATIONS

Cakaloglu, T. (Nov. 1, 2017). "Medi-Deep: Deep control in a medication usage." *2017 IEEE International Conference of Bioinfomratice and Biomedicine (BIBM)*, 899-904. Doi: 10.1109/BIBM.2017.8217776.

Neuman, M.R. et al. (May 13, 2012), "Advances in Medical Devices and Medical Electronics," in Proceedings of the IEEE, vol. 100, No. Special Centennial Issue, pp. 1537-1550,doi: 10.1109/JPROC.2012.2190684.

Qui et al. (2016) "A survey of machine learning for big data processing." *EURASIP Journal on Advances in Signal Processing*, Article No. 67, 16 pages.

Shishvan, O. Rajabi et al. (2018). "Machine Intelligence in Healthcare and Medical Cyber Physical Systems: A Survey." IEEE Access. vol. 6, 46419-46494. doi: 10.1109/ACCESS.2018.2866049.

Uniyal, D. et al. (Nov. 7, 2014), "Pervasive Healthcare—A Comprehensive Survey of Tools and Techniques," arXiv:1411.1821v1, 48 pages.

Yang, J., Mcauley, J.J., & Leskovec, J. (2013). "Community Detection in Networks with Node Attributes." 2013 IEEE 13th International Conference on Data Mining, 1151-1156.

Yaniv, Z. et al. (Oct. 1, 2016). "The National Library of Medicine Pill Image Recognition Challenge: An Initial Report." *Oct. 2016 IEEE Applied Imagery Pattern Recognition Workshop, (AIPR)*, 1-9. Doi: 10.1109/AIPR.2016.8010584.

Zhan, A. et al. (Jan. 5, 2016) "High Frequency Remote Monitoring of Parkinson's Disease via Smartphone: Platform Overview and Medication Response Detection," Retrieved Apr. 29, 2021. 12 pages.

Svendsen, K. et al. (2011). "Choosing the Unit of Measurement Counts: The Use of Oral Morphine Equivalents in Studies of Opioid Consumption Is a Useful Addition to Defined Daily Doses." Palliative Medicine, vol. 25, No. 7, Oct. 2011, pp. 725-732. DOI.org (Crossref), https://doi.org/10.1177/0269216311398300.

\* cited by examiner

| ClinicianId | PatientId | TransactionType | TransactionId | WitnessId | Drug Name | TransactionTime |
|---|---|---|---|---|---|---|
| C1 | P1 | DISPENSE | T1 | NULL | D1 | Time1 |
| C2 | P1 | DISPENSE | T2 | NULL | D1 | Time2 |
| C2 | P1 | DISPOSE | T3 | C1 | D1 | Time3 |
| C3 | P2 | DISPENSE | T4 | NULL | D2 | Time4 |
| C2 | P3 | DISPENSE | T5 | NULL | D1 | Time5 |
| C2 | P3 | DISPOSE | T6 | C1 | D1 | Time6 |
| C4 | P3 | DISPENSE CANCEL | T7 | NULL | D3 | Time7 |
| C4 | P3 | DISPENSE CANCEL | T8 | NULL | D3 | Time7 + 10 mins |
| C3 | P3 | DISPENSE | T9 | NULL | D4 | Time8 |
| C3 | P2 | DISPOSE | T10 | C4 | D4 | Time9 |
| C4 | P2 | DISPENSE | T11 | NULL | D4 | Time10 |
| C4 | P3 | DISPENSE | T12 | C3 | D2 | Time11 |
| C4 | P3 | DISPENSE | T13 | C3 | D2 | Time12 |
| C3 | P2 | DISPENSE | T14 | NULL | D3 | Time13 |
| C3 | P2 | DISPENSE | T15 | C4 | D3 | Time14 |
| C2 | P4 | DISPENSE | T16 | NULL | D2 | Time15 |
| C2 | P4 | DISPOSE | T17 | NULL | D2 | Time16 |
| C2 | P2 | DISPENSE | T18 | C1 | D2 | Time17 |
| C4 | P2 | DISPENSE | T19 | NULL | D4 | Time18 |
| C4 | P2 | DISPOSE | T20 | C3 | D4 | Time19 |

FIG. 3A

| ClinicianId | PatientId | TransactionType | TransactionId | Amount | Drug Name | AdminTime |
|---|---|---|---|---|---|---|
| C1 | P1 | ADMINISTRATION | ADMIN 1 | A1 | D1 | Time1 + 5 mins |
| C2 | P1 | ADMINISTRATION | ADMIN 2 | A2 | D1 | Time2 + 3 hours |
| C3 | P2 | ADMINISTRATION | ADMIN 3 | A3 | D2 | Time4 + 10 mins |
| C4 | P2 | ADMINISTRATION | ADMIN 4 | A4 | D4 | Time10 + 4 mins |
| C4 | P3 | ADMINISTRATION | ADMIN 5 | A5 | D2 | Time12 + 3 mins |

FIG. 3B

RARE INSTANCE ANALYTICS FOR DIVERSION DETECTION

CROSS-REFERENCE TO RELATED APPLICATION

This application is a national stage entry of Patent Cooperation Treaty Application No. PCT/US20/52824 filed Sep. 25, 2020, entitled "RARE INSTANCE ANALYTICS FOR DIVERSION DETECTION," which claims priority to U.S. Patent Application Ser. No. 62/907,295, filed on Sep. 27, 2019, entitled "RARE INSTANCE ANALYTICS FOR DIVERSION DETECTION", the contents of which is incorporated by reference herewith in its entirety.

TECHNICAL FIELD

The subject matter described herein relates generally to data science and more specifically to the identification of rare data signals indicative of diversion.

BACKGROUND

Diversion may refer to the transfer of a controlled and/or high-value substance to a third party who is not legally authorized to receive, possess, and/or consume the substance for personal use or personal gain. High-value and/or controlled prescription medications, notably opioids, may be especially prone to diversion. For instance, a prescription pain medication may be diverted when a clinician keeps the prescription pain medication for unauthorized personal use instead of administering the prescription pain medication to a patient or wasting the prescription pain medication.

SUMMARY

Systems, methods, and articles of manufacture, including computer program products, are provided for identifying rare data signals that are indicative of diversion. For example, an analytics engine may analyze the activities of different clinicians including by applying one or more machine learning models trained to determine whether the activity pattern of a clinician deviates from the norm for clinicians in the same peer community. Nevertheless, conventional statistical analysis techniques, such as machine learning models, may disregard infrequent activity patterns that occur at a below threshold frequency as being statistically insignificant even though some infrequent activity patterns may be definitive indicators of diversion. As such, in some example embodiments, the analytics engine may be configured to analyze infrequent activity patterns based on one or more data models corresponding to various anomalous behavior. The analytics engine may determine that a clinician exhibits anomalous behavior based on the activity data of the clinician including an infrequent activity pattern matching the one or more data models. Moreover, in response to determining that the clinician exhibits anomalous behavior, the analytics engine may trigger an investigative workflow.

In one aspect, there is provided a system for identifying rare data signals that are indicative of diversion. The system may include at least one data processor and at least one memory. The at least one memory may store instructions that result in operations when executed by the at least one data processor. The operations may include: identifying an activity pattern associated with a first clinician as being an infrequent activity pattern that occurs below a threshold frequency; determining, based at least on one or more data models, whether the infrequent activity pattern corresponds to an anomalous behavior; and triggering an investigative workflow in response to the infrequent activity pattern being determined to correspond to the anomalous behavior.

In some variations, one or more features disclosed herein including the following features can optionally be included in any feasible combination. The activity pattern may include a plurality of transaction records generated in response to the first clinician interacting with one or more data systems.

In some variations, the one or more data systems may include an access control system, a dispensing system, an infusion system, a compounding system, and/or an electronic medical record system.

In some variations, the plurality of transaction records may include one or more transaction values corresponding to a timestamp, a patient identifier, a device identifier, a clinician identifier, a medication identifier, a prescription order identifier, an inventory information, a patient status, a shift identifier, a location tracking identifier, an infusion information, a compounding information, an administration information, a working off clock indicator, and/or an electronic health record identifier.

In some variations, the one or more data models may be generated based on a series of transaction records known to be associated with one or more types of anomalous behavior that are indicative of diversion.

In some variations, each of the one or more data models may include a combination of reference transaction values representative of a corresponding type of anomalous behavior. The combination of reference transaction values may include one or more reference transaction values for the timestamp, the patient identifier, the device identifier, the clinician identifier, the medication identifier, the prescription order identifier, the inventory information, the patient status, the shift identifier, the location tracking identifier, the infusion information, the compounding information, the administrative information, the working off clock indicator, and/or the electronic health record identifier.

In some variations, the anomalous behavior may include the first clinician routinely selecting a second clinician to witness a wasting of medication while the second clinician also serves as a witness for a third clinician wasting medication.

In some variations, the anomalous behavior may include the first clinician routinely selecting a second clinician to witness a wasting of medication and the second clinician routinely selecting the first clinician to witness the wasting of medication.

In some variations, the anomalous behavior may include the first clinician withdrawing a medication for a deceased patient and/or a discharged patient.

In some variations, the anomalous behavior may include the first clinician routinely accessing a medical management device within a threshold quantity of time after another clinician.

In some variations, the anomalous behavior may include a paired cancellation of transactions, an unexpected forced opening of a medication management device, a clinician interacting with the medication management device when the clinician not scheduled to work, the clinician interacting with the medication management device when the clinician is not clocked in to for work, and/or the clinician interacting with the medication management device at an abnormal time.

In some variations, the investigative workflow may include sending, to a client device, an alert indicating the first clinician as exhibiting the anomalous behavior.

In some variations, the investigative workflow may include activating one or more surveillance devices in response to the first clinician interacting with a medical management device and/or isolating a medication accessed by the first clinician.

In some variations, the infrequent activity pattern may be identified based at least on a signal-to-noise ratio associated with the infrequent activity pattern being below a threshold value.

In some variations, the infrequent activity pattern may be determined to correspond to the anomalous behavior in response to a match between a first plurality of transaction values forming the infrequent activity pattern and a second plurality of reference transaction values included in a data model of the anomalous behavior being above a threshold value.

In some variations, the threshold value may be adjusted in response to a misidentification of more than a threshold quantity of infrequent activity patterns.

In another aspect, there is provided a method for identifying rare data signals that are indicative of diversion. The method may include: identifying an activity pattern associated with a first clinician as being an infrequent activity pattern that occurs below a threshold frequency; determining, based at least on one or more data models, whether the infrequent activity pattern corresponds to an anomalous behavior; and triggering an investigative workflow in response to the infrequent activity pattern being determined to correspond to the anomalous behavior.

In some variations, one or more features disclosed herein including the following features can optionally be included in any feasible combination. The activity pattern may include a plurality of transaction records generated in response to the first clinician interacting with one or more data systems.

In some variations, the one or more data systems may include an access control system, a dispensing system, an infusion system, a compounding system, and/or an electronic medical record system.

In some variations, the plurality of transaction records may include one or more transaction values corresponding to a timestamp, a patient identifier, a device identifier, a clinician identifier, a medication identifier, a prescription order identifier, an inventory information, a patient status, a shift identifier, a location tracking identifier, an infusion information, a compounding information, an administration information, a working off clock indicator, and/or an electronic health record identifier.

In some variations, the one or more data models may be generated based on a series of transaction records known to be associated with one or more types of anomalous behavior that are indicative of diversion.

In some variations, each of the one or more data models may include a combination of reference transaction values representative of a corresponding type of anomalous behavior. The combination of reference transaction values may include one or more reference transaction values for the timestamp, the patient identifier, the device identifier, the clinician identifier, the medication identifier, the prescription order identifier, the inventory information, the patient status, the shift identifier, the location tracking identifier, the infusion information, the compounding information, the administration information, the working off clock indicator, and/or the electronic health record identifier.

In some variations, the anomalous behavior may include the first clinician routinely selecting a second clinician to witness a wasting of medication while the second clinician also serves as a witness for a third clinician wasting medication.

In some variations, the anomalous behavior may include the first clinician routinely selecting a second clinician to witness a wasting of medication and the second clinician routinely selecting the first clinician to witness the wasting of medication.

In some variations, the anomalous behavior may include the first clinician withdrawing a medication for a deceased patient and/or a discharged patient.

In some variations, the anomalous behavior may include the first clinician routinely accessing a medical management device within a threshold quantity of time after another clinician.

In some variations, the anomalous behavior may include a paired cancellation of transactions, an unexpected forced opening of a medication management device, a clinician interacting with the medication management device when the clinician not scheduled to work, the clinician interacting with the medication management device when the clinician is not clocked in to for work, and/or the clinician interacting with the medication management device at an abnormal time.

In some variations, the investigative workflow may include sending, to a client device, an alert indicating the first clinician as exhibiting the anomalous behavior.

In some variations, the investigative workflow may include activating one or more surveillance devices in response to the first clinician interacting with a medical management device and/or isolating a medication accessed by the first clinician.

In some variations, the infrequent activity pattern may be identified based at least on a signal-to-noise ratio associated with the infrequent activity pattern being below a threshold value.

In some variations, the infrequent activity pattern may be determined to correspond to the anomalous behavior in response to a match between a first plurality of transaction values forming the infrequent activity pattern and a second plurality of reference transaction values included in a data model of the anomalous behavior being above a threshold value.

In some variations, the threshold value may be adjusted in response to a misidentification of more than a threshold quantity of infrequent activity patterns.

In another aspect, there is provided a non-transitory computer readable medium storing instructions that result in operations when executed by at least one data processor. The operations may include: identifying an activity pattern associated with a first clinician as being an infrequent activity pattern that occurs below a threshold frequency; determining, based at least on one or more data models, whether the infrequent activity pattern corresponds to an anomalous behavior; and triggering an investigative workflow in response to the infrequent activity pattern being determined to correspond to the anomalous behavior.

In another aspect, there is provided an apparatus for identifying rare data signals that are indicative of diversion. The apparatus may include: means for identifying an activity pattern associated with a first clinician as being an infrequent activity pattern that occurs below a threshold frequency; means for determining, based at least on one or more data models, whether the infrequent activity pattern corresponds to an anomalous behavior; and means for triggering an investigative workflow in response to the infrequent activity pattern being determined to correspond to the anomalous behavior.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to detecting the diversion of controlled and/or high-value substances, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Diversion of a medication may occur at any point in time including, for example, during the shipping, receiving, stocking, dispensing, administration, and/or wasting of the medication. Prescription pain medications may be especially prone to diversion due to a lack of sufficient custodial oversight during, for instance, the shipping, receiving, stocking, dispensing, administration, and/or wasting of the prescription pain medication. For example, dispensing cabinets at medical facilities may be accessible to multiple clinicians. Moreover, different clinicians may be responsible for the dispensing, administration, and wasting of the medication. Thus, even when diversion is detected, it may be difficult to determine when the diversion actually occurred and identify the clinicians responsible for the diversion.

To identify clinicians who may be engaged in the diversion, an analytics engine may analyze transactional data representative of the activities of different clinicians including by applying one or more machine learning models trained to determine whether the activity pattern of a clinician deviates from the norm for clinicians in the same peer community. For example, the machine learning models may be trained to identify, based on transaction records from one or more medical data systems, one or more peer communities of clinicians who should exhibit the same and/or similar activity patterns. Moreover, the machine learning models may be trained to identify, based on the transaction records from the one or more medical data systems, one or more clinicians whose activity patterns deviate from the norm for clinicians in the same peer community.

The machine learning models applied to analyze the transaction records from the one or more medical data systems may disregard infrequent activity patterns that occur below a threshold frequency as statistically insignificant. In doing so, the machine learning models may overlook anomalous behavior that are rarely observed but nevertheless highly indicative of diversion. As such, in some example embodiments, instead of disregarding infrequent activity patterns that occur below a threshold frequency as statistically insignificant, the analytics engine may be configured to analyze at least some infrequent activity patterns based on one or more data models of anomalous behavior that are rarely observed but nevertheless highly indicative of diversion.

Examples of such anomalous behavior may include predatory wasting in which a clinician routinely selects the same clinician to witness the wasting of medications, waste buddies in which a group of clinicians routinely serve as each other's witness during the wasting of medications, tailgating in which a clinician routinely accesses a medication management device within a threshold quantity of time after another clinician, withdrawal of medication for a discharged patient, withdrawal of medication for a deceased patient, paired cancellation of transactions, unexpected forced opening of a medication management device, a clinician interacting with a medication management device when the clinician is not scheduled to work, a clinician interacting with a medication management device when the clinician is not clocked in to for work, a clinician interaction with a medication management device at an abnormal time (e.g., when such an interaction does not typically occur), an isolated but significant change in behavior, and/or the like. As used herein, "routine" may describe behavior that occurs at an above threshold quantity, frequency, and/or proportion. For example, predatory wasting may refer to a type of anomalous behavior in which the same clinician is routinely selected to witness the wasting of medication by being selected at an above threshold quantity, frequency, and/or proportion.

In some example embodiments, the analytics engine may respond to the identification of clinician exhibiting anomalous behavior by at least triggering an investigative workflow. The investigative workflow may include the analytics engine generating and sending an alert identifying the clinician exhibiting anomalous behavior. Alternatively and/or additionally, the investigative workflow may include the analytics engine activating one or more surveillance devices (e.g., video cameras, still image cameras, audio recorders, and/or the like) at a medication management device whenever the clinician accesses the medical management device. The investigative workflow may also include the analytics engine configuring a medical management device to isolate the medication accessed by the clinician.

Figure 1:
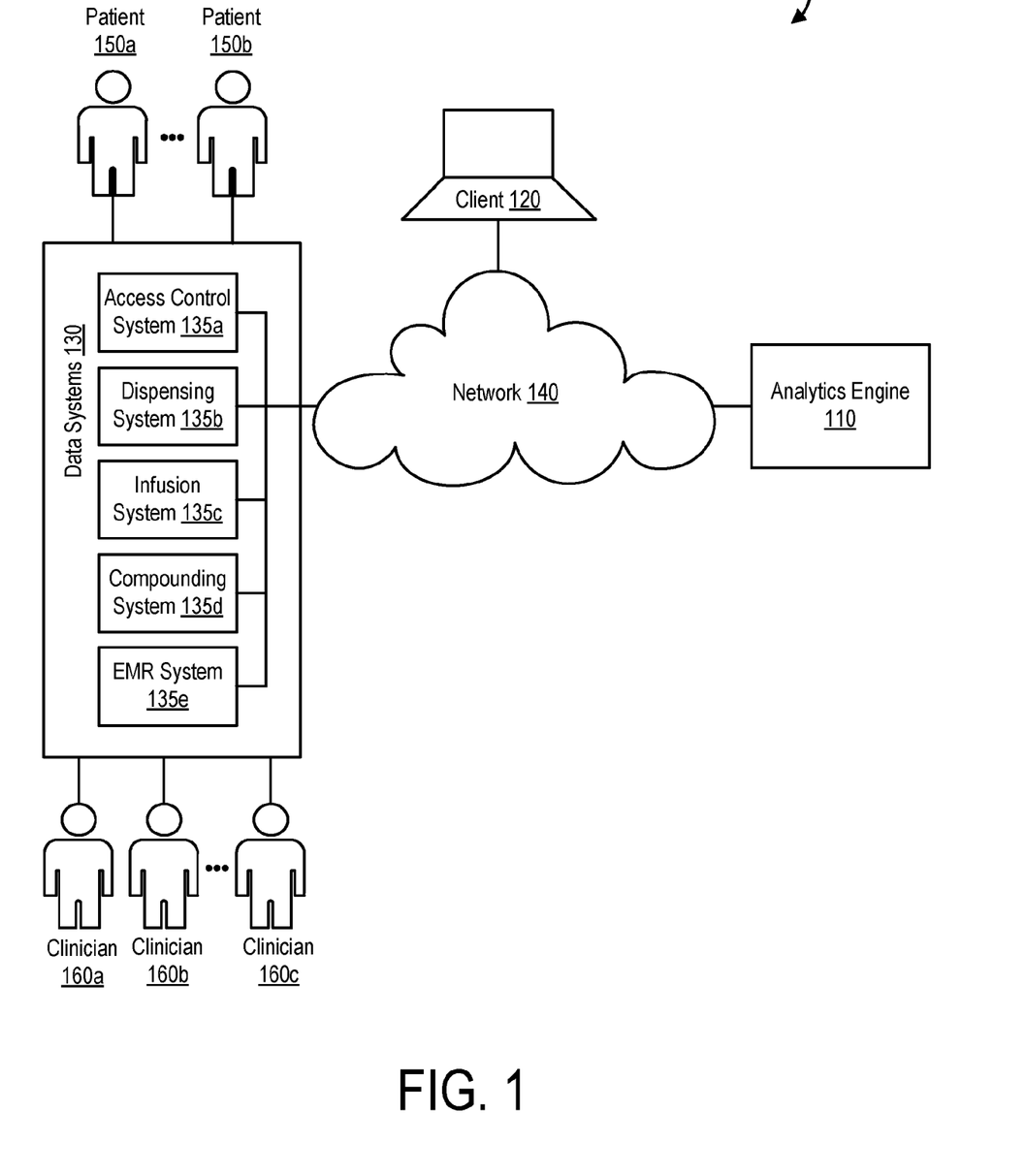
FIG. 1 depicts a system diagram illustrating a tracking system, in accordance with some example embodiments.

FIG. 1 depicts a system diagram illustrating a tracking system 100, in accordance with some example embodiments. Referring to FIG. 1, the tracking system 100 may include an analytics engine 110, a client 120, and one or more data systems 130. As FIG. 1 shows, the analytics engine 110, the client 120, and the data systems 130 may be communicatively coupled via a network 140. The client 120 may be a processor-based device such as, for example, a smartphone, a tablet computer, a wearable apparatus, a desktop computer, a laptop computer, a workstation, and/or the like. Meanwhile, the network 140 may be a wired and/or wireless network including, for example, a public land mobile network (PLMN), a local area network (LAN), a virtual local area network (VLAN), a wide area network (WAN), the Internet, and/or the like.

Referring again to FIG. 1, the data systems 130 may include an access control system 135a, a dispensing system 135b, an infusion system 135c, a compounding system 135d, and an electronic medical record (EMR) system 135e. While treating a first patient 150a and/or a second patient 150b, a first clinician 160a, a second clinician 160b, and/or a third clinician 160c may interact with the data systems 130 and trigger the generation of one or more corresponding transaction records. In some example embodiments, the activity patterns of the first clinician 160a, the second clinician 160b, and/or the third clinician 160c may be determined based on at least a portion of the transaction records that are generated as a result of the first clinician 160a, the second clinician 160b, and/or the third clinician 160c interacting with the data systems 130 including, for example, the access control system 135a, the dispensing system 135b, the infusion system 135c, the compounding system 135d, the electronic medical record system 135e, and/or the like.

For example, the first clinician 160a dispensing a medication for the first patient 150a from a dispensing cabinet may trigger the generation of a transaction record that includes a timestamp, a clinician identifier of the first clinician 160a, a device identifier of the dispensing cabinet, a patient identifier of the first patient 150a, an identifier of the medication retrieved from the dispensing cabinet, a quantity of the medication retrieved from the medication cabinet, and/or the like. Alternatively and/or additionally, the first clinician 160a using a wasting station to waste unused medication from the first patient 150a may trigger the generation of another transaction record that includes a timestamp, the clinician identifier of the first clinician 160a, a clinician identifier of the second clinician 160b witnessing the wasting, a device identifier of the wasting station, the patient identifier of the first patient 150a, an identifier of the medication being wasted, a quantity of the medication being wasted, and/or the like. As used herein, the "wasting" of a medication may refer to the disposal of a substance in accordance with institutional guidelines and/or government regulations. For example, the proper wasting of a prescription pain medication may require the controlled substance to be collected in a designated receptacle (e.g., wasting stations) while in the presence of one or more witnesses.

It should be appreciated that the one or more data systems 130 may also provide non-transactional data. For instance, the electronic medical record system 135c may store a plurality of electronic medical records (EMRs), each of which including a patient's history including, for example, past opioid use and/or the like. While the first clinician 160a, the second clinician 160b, and/or the third clinician 160c interacting with the electronic medical record system 135c to create, update, and/or retrieve an electronic medical record for the first patient 150a and/or the second patient 150b may generate a timestamp transaction record, the electronic medical record itself is not a transaction record.

An infrequent activity pattern may refer to an activity pattern that occurs below a threshold frequency and is therefore typically disregarded as statistically insignificant. For example, the signal-to-noise ratio (SNR) associated with an infrequent activity pattern may not exceed a threshold value. Conventional statistical analysis techniques, such as machine learning models, may therefore disregard infrequent activity patterns when determining whether the first clinician 160a, the second clinician 160b, and/or the third clinician 160c exhibit anomalous behavior indicative of diversion. Nevertheless, at least some infrequent activity patterns may be definitive indicators of diversion. As such, in some example embodiments, the analytics engine 110 may be configured to determine whether the first clinician 160a, the second clinician 160b, and/or the third clinician 160c exhibit anomalous behavior by at least analyzing infrequent activity patterns associated with the first clinician 160a, the second clinician 160b, and/or the third clinician 160c.

As used herein, the signal-to-noise ratio of an activity pattern may measure a difference between the signal corresponding to the activity pattern and the noise corresponding to activity patterns associated with non-anomalous behavior. A machine learning model (or another conventional statistical analysis technique) may determine that the activity pattern corresponds to anomalous behavior indicative of diversion if there is a sufficient difference between the signal corresponding to the activity pattern and the noise corresponding to activity patterns associated with non-anomalous behavior. For example, a clustering based machine learning model may determine that the activity pattern corresponds to anomalous behavior indicative of diversion if the activity pattern is more than a threshold distance away from one or more clusters of activity patterns associated with non-anomalous behavior.

By contrast, an infrequent activity pattern may be associated with a low signal-to-noise ratio because the activity pattern may occur too rarely for the signal corresponding to the infrequent activity pattern to exhibit sufficient different relative to the noise corresponding to activity patterns associated with non-anomalous behavior. For example, the clustering based machine learning model may disregard infrequent activity patterns that is not more than a threshold distance away from the one or more clusters of activity patterns associated with non-anomalous behavior. Nevertheless, some infrequent activity patterns may nevertheless be definitive indicators of diversion.

Accordingly, in some example embodiments, the analytics engine 110 may analyze an infrequent activity pattern associated with a low signal-to-noise ratio instead of disregarding the infrequent activity pattern based on the infrequent activity pattern being associated with a below threshold signal-to-noise ratio. For example, the analytics engine 110 may analyze the infrequent activity pattern based on one or more data models of anomalous behavior that are rarely observed but highly indicative of diversion. The infrequent activity pattern may include a series of transaction records generated, for example, by the data systems 130. Each transaction record may include one or more transaction values corresponding to, for example, timestamps, patient identifiers, device identifiers, clinician identifiers, medication identifiers, prescription order identifiers, inventory information, patient status, shift identifiers, location tracking identifiers, infusion information, compounding information, administration information, working off clock indicators, electronic health record (EHR) identifiers, and/or the like.

In some example embodiments, the one or more data models may be generated based on a series of transaction records known to be associated with anomalous behavior that are rarely observed but highly indicative of diversion. As such, each data model may include a combination of reference transaction values that are representative of a corresponding type of anomalous behavior including, for example, patient identifiers, device identifiers, clinician identifiers, medication identifiers, prescription order identifiers, inventory information, patient status, shift identifiers, location tracking identifiers, electronic health record (EHR) identifiers, infusion information, compounding information, administration information, working off clock indicators, and/or the like. Accordingly, the analytics engine 110 may determine that an infrequent activity pattern corresponds to a type of anomalous behavior indicative of diversion based at least on the infrequent activity pattern matching a corresponding data model. For example, the analytics engine 110 may determine that an infrequent activity pattern corresponds to a type of anomalous behavior indicative of diversion in response to a match between the transaction values forming the infrequent activity pattern and the reference transaction values included in a data model of the anomalous behavior being above a threshold value (e.g., 90% identical and/or the like). The sensitivity of the analytics engine 110, including a frequency and/or a quantity of infrequent activity patterns being identified as anomalous, may be adjusted by at least adjusting the threshold value. For instance, the threshold value may be adjusted in response to the analytics engine 110 misidentifying more than a threshold quantity of infrequent activity patterns.

Examples of anomalous behavior that are rarely observed but indicative of diversion may include predatory wasting in which a clinician routinely selects the same clinician to witness the wasting of medications, waste buddies in which a group of clinicians routinely serve as each other's witness during the wasting of medications, tailgating in which a clinician routinely accesses a medication management device within a threshold quantity of time after another clinician, withdrawal of medication for a discharged patient, withdrawal of medication for a deceased patient, paired cancellation of transactions, unexpected forced opening of a medication management device, a clinician interacting with a medication management device when the clinician is not scheduled to work, a clinician interacting with a medication management device when the clinician is not clocked in to for work, a clinician interaction with a medication management device at an abnormal time (e.g., when such an interaction does not typically occur), and an isolated but significant change in behavior.

To further illustrate, referring again to FIG. 1, the analytics engine 110 may determine that the first clinician 160*a* exhibits anomalous behavior if the transaction records from the data system 130 matches a data model in which the a clinician (e.g., the first clinician 160*a*) withdraws medication for a patient (e.g., the first patient 150*a*) who is already discharged or deceased. For example, a first transaction record from the data systems 130 may indicate that the electronic health record of the first patient 150*a* was updated at a first time $t_1$ to change the status of the first patient 150*a* to deceased or discharged but a second transaction record from the data system 130 may indicate that the first clinician 160*a* withdrew medication for the first patient 150*b* at a later time $t_2$.

The analytics engine 110 may determine that the first clinician 160*a* exhibits predatory wasting behavior if the transaction records from the data system 130 (e.g., one or more wasting stations) matches another data model in which the one clinician (e.g., the first clinician 160*a*) routinely selects the same clinician (e.g., the second clinician 160*b*) to witness the wasting of medications but that same clinician (e.g., the second clinician 160*b*) also serves as a witness for other clinicians (e.g., the third clinician 160*c*). For instance, transaction records associated with the first clinician 160*a* wasting a medication may always include the clinician identifier of the second clinician 160*b* as a witness although the clinician identifier of the second clinician 160*b* may also appear as a witness in transaction records associated with the third clinician 160*c* wasting a medication. Alternatively, the analytics engine 110 may determine that the first clinician 160*a* and the second clinician 160*b* are wasting buddies if the transaction records from the data system 130 matches a data model in which the same pair of clinicians (e.g., first clinician 160*a* and the second clinician 160*b*) routinely serve as a witness for each other. For example, transaction records associated with the first clinician 160*a* wasting a medication may always include the clinician identifier of the second clinician 160*b* as a witness while transaction records associated with the second clinician 160*b* wasting a medication may always include the clinician identifier of the first clinician 160*a* as a witness.

Figure 3A:
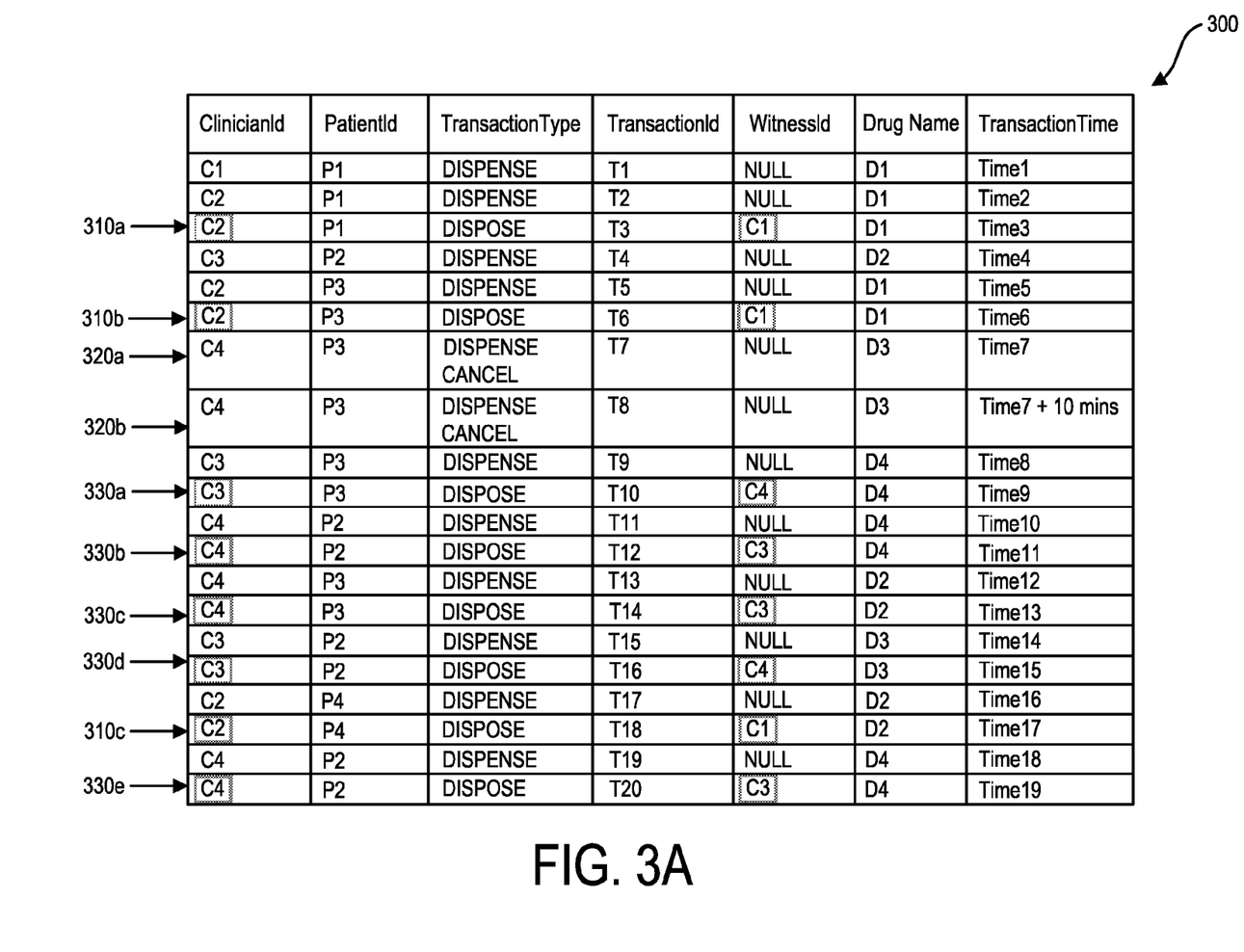
FIG. 3A depicts an example of a data model, in accordance with some example embodiments.

To further illustrate, FIG. 3A depicts an example of a data model 300, in accordance with some example embodiments. Referring to FIG. 3A, the data model 300 may include one or more transaction records from the dispensing system 135*b*. As shown in FIG. 3A, each transaction record from the dispensing system 135*b* may include a clinician identifier, a patient identifier, a transaction type, a transaction identifier, a witness identifier, a medication identifier, and a transaction time. The data model 300 may correspond to one o or more types of anomalous behavior of predatory wasting, waste buddies, and paired cancellation of transactions.

Referring again to FIG. 3A, the data model 300 may include a first transaction 310*a*, a second transaction 310*b*, and a third transaction 310*c* in which a clinician C2 routinely selects a clinician C1 to serve as a witness to the wasting of medications. The first transaction 310*a*, the second transaction 310*b*, and the third transaction 310*c* may correspond to the anomalous behavior of predatory wasting in which a first clinician routinely selects the same second clinician to witness the wasting of medications while other clinicians do not exhibit a same preference for selecting the second clinician to witness the wasting of medication. It should be appreciated that whether the first clinician is engaging in predatory wasting may be further determined based on the availability of other clinicians to witness the wasting of medication. For example, the first clinician may not in fact be engaged in predatory wasting if the first clinician and the second clinician are the only clinicians on staff during their shift.

The data model 300 may also include a fourth transaction 320a and a fifth transaction 320b, which are canceled at substantially the same time. For example, the fourth transaction 320a, which is a transaction to dispense a medication D3, may be canceled at a transaction time Time7. Meanwhile, the fifth transaction 320b, which is also a transaction to dispense the medication D3, may be canceled a short amount of time later (e.g., 10 minutes after Time 7). The fourth transaction 320a and the fifth transaction 320b may correspond to the anomalous behavior of paired cancellations in which multiple transactions to dispense a medication are canceled at substantially the same time. The cancellation of multiple transactions to dispense a medication at substantially the same time may be further indicative of one or more of the clinicians associated with the canceled transactions (e.g., a clinician C4) of engaging in the adulteration of the medication D3 from the dispensing system 135.

As shown in FIG. 3A, the data model 300 may further include a sixth transaction 330a, a seventh transaction 330b, an eighth transaction 330c, a ninth transaction 330d, and a tenth transaction 330e in which a clinician C3 and the clinician C4 routinely serve as each other's witness during the wasting of medications. The sixth transaction 330a, the seventh transaction 330b, the eighth transaction 330c, the ninth transaction 330d, and the tenth transaction 330e may therefore correspond to the anomalous behavior of waste buddies in which a group of clinicians routinely serve as each other's witness during the wasting of medications.

Figure 3B:
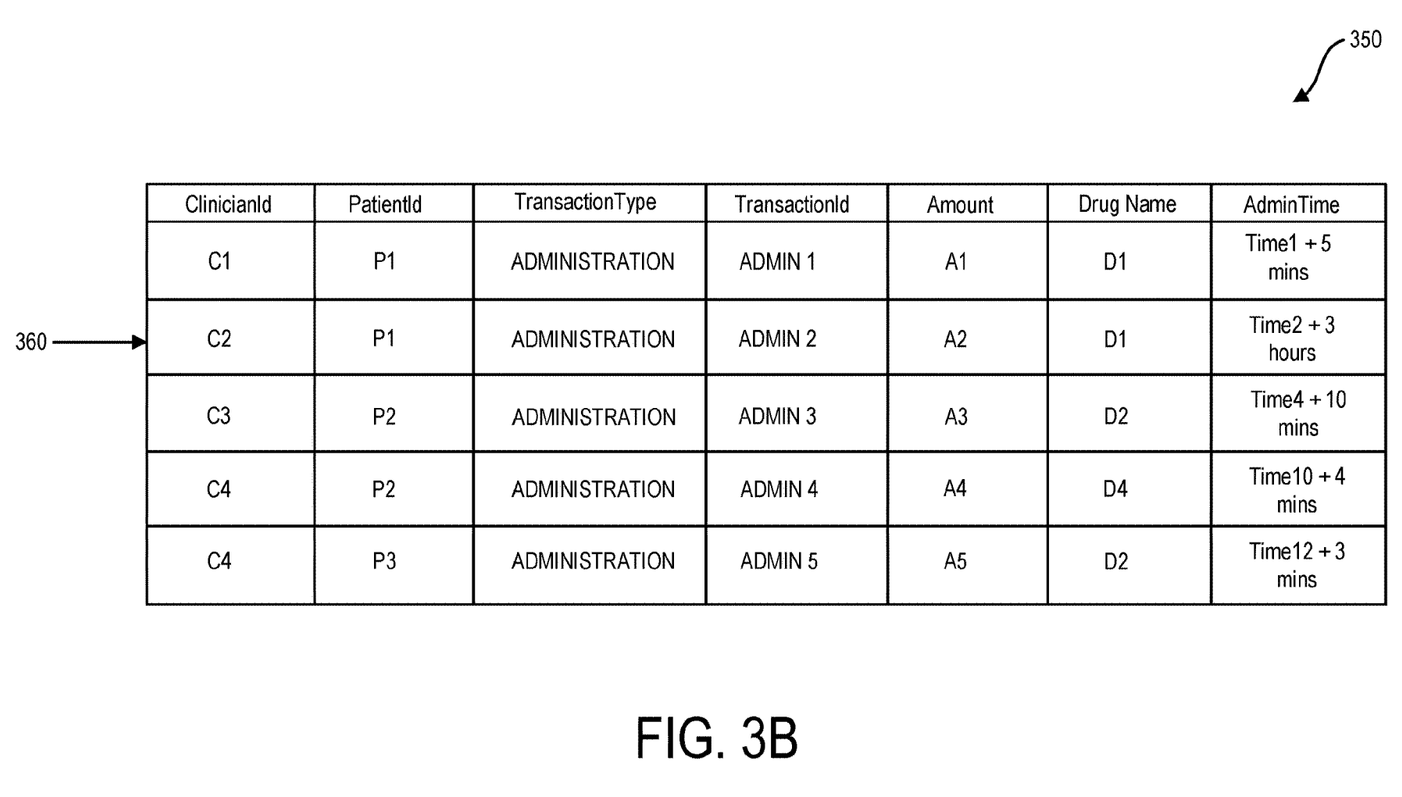
FIG. 3B depicts another example of a data model, in accordance with some example embodiments.

FIG. 3B depicts another example of a data model 350, in accordance with some example embodiments. Referring to FIG. 3B, the data model 350 may include one or more transaction records from the electronic medical record system 135c. As shown in FIG. 3B, each transaction record from the electronic medical record system 135c may include a clinician identifier, a patient identifier, a transaction type, a transaction identifier, a quantity of medication, a medication identifier, and a transaction time.

In the example shown in FIG. 3B, each of the transaction records included in the data model 350 may indicate a type of transaction that is performed by a clinician for a patient. For example, each of the transaction records included in the data model 350 may indicate when a certain type and quantity of medication is administered by a clinician to a patient. The data model 350 may include, for example, a transaction 360 in which an excessive quantity of time lapses (e.g., 3 hours) lapses between when a medication D1 was dispensed by the clinician C2 and when the clinician C2 administers the medication to a patient P1. The transaction 360 may correspond to the anomalous behavior of delayed administration, which may indicate that the clinician C2 may be engaged in the adulteration of the medication D1 and/or the diversion of the medication D1.

Figure 2:
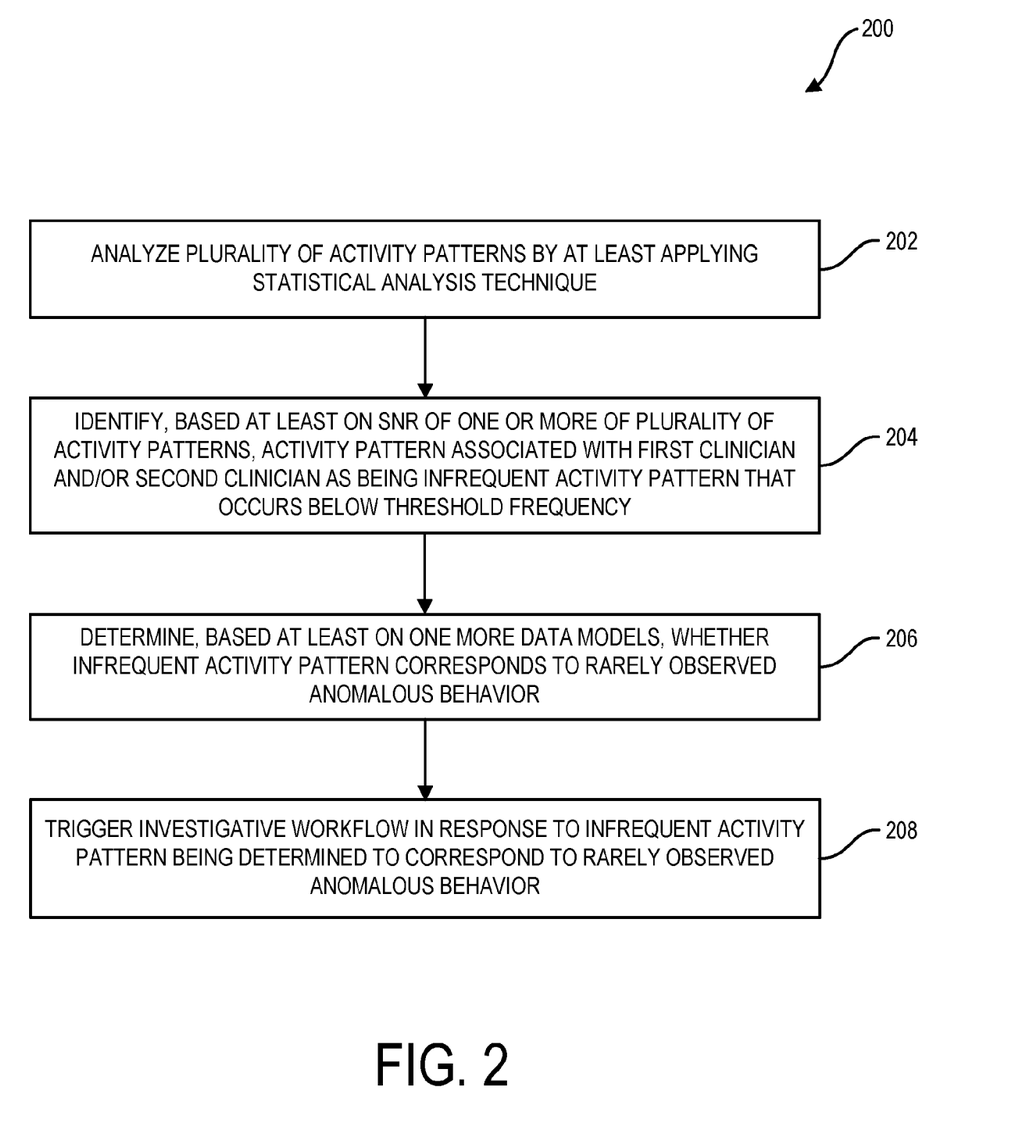
FIG. 2 depicts a flowchart illustrating a process for detecting anomalous behavior, in accordance with some example embodiments.

FIG. 2 depicts a flowchart illustrating a process 200 for detecting anomalous behavior, in accordance with some example embodiments. Referring to FIG. 2, the process 200 may be performed by the analytics engine 110.

At 202, the analytics engine 110 may analyze a plurality of activity patterns by at least applying a statistical analysis technique. For example, the analytics engine 110 may analyze the activity patterns of the first clinician 160a, the second clinician 160b, and/or the third clinician 160c exhibit anomalous behavior indicative of diversion. The activity patterns of the first clinician 160a, the second clinician 160b, and/or the third clinician 160c may include a plurality of transaction records from the data system 130, which may be generated in response to the first clinician 160a, the second clinician 160b, and/or the third clinician 160c interacting with the data systems 130 including, for example, the access control system 135a, the dispensing system 135b, the infusion system 135c, the compounding system 135d, the electronic medical record system 135e, and/or the like. In some example embodiments, the analytics engine 110 may analyze the activity patterns of the first clinician 160a, the second clinician 160b, and/or the third clinician 160c by applying one or more machine learning models. For example, the analytics engine 110 may apply a first machine learning model trained to identify one or more peer communities of clinicians who should exhibit the same and/or similar activity pattern. Moreover, the analytics engine 110 may apply a second machine learning trained to determine whether the activity pattern of a clinician deviates from the norm for clinicians in the same peer community.

At 204, the analytics engine 110 may identify, based at least on a signal-to-noise ratio (SNR) of one or more of the plurality of activity patterns, an activity pattern associated with a first clinician and/or a second clinician as being an infrequent activity pattern that occurs below a threshold frequency. In some example embodiments, the analytics engine 110 may be configured to recognize an infrequent activity pattern that occurs at a below threshold frequency. For example, the analytics engine 110 may identify, based at least on a below threshold signal-to-noise ratio, the activity patterns of the first clinician 160a and/or the second clinician 160b as being an infrequent activity pattern. As noted, infrequent activity patterns are typically disregarded as statically insignificant. Nevertheless, at least some infrequent activity patterns may be definitive indicators of diversion. As such, the analytics engine 110 may be configured to determine whether the first clinician 160a and/or the second clinician 160b exhibits anomalous behavior by at least analyzing the infrequent activity pattern associated with the first clinician 160a and/or the second clinician 160b.

At 206, the analytics engine 110 may determine, based at least on one or more data models, whether the infrequent activity pattern corresponds to an anomalous behavior. In some example embodiments, the analytics engine 110 may analyze an infrequent activity pattern based on one or more data models of anomalous behavior that are rarely observed but highly indicative of diversion. As noted, an infrequent activity pattern may include a series of transaction records (e.g., from the data systems 130) while a data model may include a combination of transaction values that are representative of a corresponding type of anomalous behavior including, for example, patient identifiers, device identifiers, clinician identifiers, medication identifiers, prescription order identifiers, inventory information, patient status, shift identifiers, location tracking identifiers, electronic health record (EHR) identifiers, infusion information, compounding information, administration information, working off clock indicators, and/or the like. Accordingly, the analytics engine 110 may determine that an infrequent activity pattern corresponds to a type of anomalous behavior that is rarely observed but indicative of diversion based at least on the infrequent activity pattern matching a corresponding data model.

For example, the analytics engine 110 may determine that the first clinician 160a exhibits anomalous behavior if the transaction records from the data system 130 matches a data model in which the a clinician (e.g., the first clinician 160a) withdraws medication for a patient (e.g., the first patient 150a) who is already discharged or deceased. The analytics engine 110 may determine that the first clinician 160a exhibits predatory wasting behavior if the transaction records from the data system 130 (e.g., one or more wasting stations) matches another data model in which the one clinician (e.g., the first clinician 160a) routinely selects the same clinician (e.g., the second clinician 160b) to witness the wasting of medications but that same clinician (e.g., the second clinician 160b) also serves as a witness for other clinicians (e.g., the third clinician 160c). Alternatively, the analytics engine 110 may determine that the first clinician 160a and the second clinician 160b are wasting buddies if the transaction records from the data system 130 matches a data model in which the same pair of clinicians (e.g., first clinician 160a and the second clinician 160b) routinely serve as a witness for each other.

In some example embodiments, the analytics engine 110 may determine that an infrequent activity pattern corresponds to a type of anomalous behavior indicative of diversion in response to a match between the transactions values forming the infrequent activity pattern and the reference transaction values included in a data model of the anomalous behavior being above a threshold value (e.g., 90% identical and/or the like). The sensitivity of the analytics engine 110 may be adjusted by at least adjusting the threshold value. For example, decreasing the threshold value may increase the sensitivity of the analytics controller 110 while increasing the threshold value may decrease the sensitivity of the analytics controller 110. As such, the threshold value may be increased if the analytics engine 110 misidentifies an excessive quantity of non-anomalous infrequent activity patterns as being anomalous. Alternatively, the threshold may be decreased if the analytics engine 110 fails to identify an excessive quantity of anomalous infrequent activity patterns as being anomalous.

At 208, the analytics engine 110 may trigger an investigative workflow in response to the infrequent activity pattern being determined to correspond to the anomalous behavior. For example, in response to determining that the first clinician 160a and/or the second clinician 160b exhibit one or more types of anomalous behavior, the analytics engine 110 may trigger an investigative workflow that includes generating and sending an alert to the client 120 via the network 140. Alternatively and/or additionally, the investigative workflow may include the analytics engine 110 configuring the one or more data systems 130 to activate one or more surveillance devices (e.g., video cameras, still image cameras, audio recorders, and/or the like) at a medical management device (e.g., a dispensing cabinet, a wasting station, and/or the like) whenever the first clinician 160a and/or the second clinician 160b accesses the medical management device. The investigative workflow may further include the analytics engine 110 configuring the one or more data systems 130 to isolate medication accessed by the first clinician 160a and/or the second clinician 160b. For instance, the analytics engine 110 may configure a wasting station to isolate unused medication that the first clinician 160a and/or the second clinician 160b disposes at the wasting station by providing a separate receptacle for the medication instead of a shared receptacle that comingles unused medication disposed by multiple clinicians.

In some example embodiments, the analytics engine 110 may trigger the investigative workflow by at least activating a sensor or other collection device within the tracking system 100. The activation may include transmitting a control message to a device to configure the device to initiate collection of information for the investigative workflow such as biometrics of the target of the investigation, electronic medical records for patients interacted with by or near the target of the investigation, location information for the target during one or more shifts, peer clinician information (e.g., peers working with or near to the target), etc. This can be particularly useful to collect information without necessarily alerting a target of the investigation of the investigation. If the target of the investigation were made aware of the data collection, the target of the investigation may alter behavior or take further steps to avoid detection or undermine the integrity of the investigation. Such features provide a technical solution to ensure efficiency and reliability of the investigative workflow.

Figure 4:
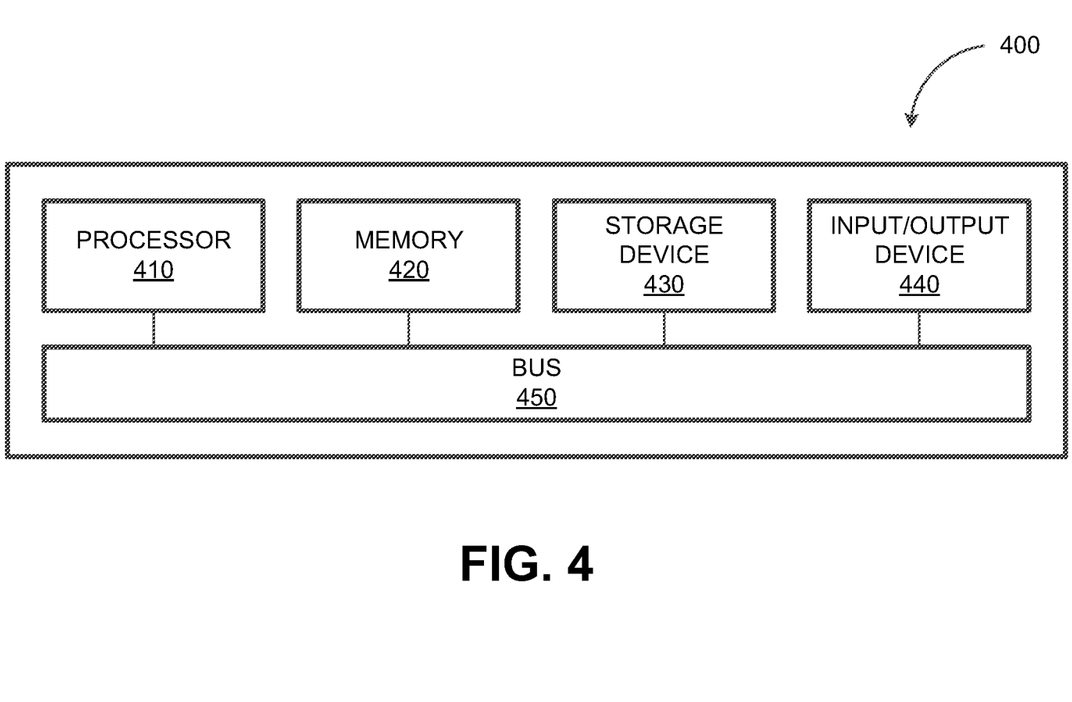
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1 and 2, the computing system 400 can be used to implement the analytics engine 110 and/or any components therein.

As shown in FIG. 4, the computing system 400 can include a processor 410, a memory 420, a storage device 430, and input/output device 440440. The processor 410, the memory 420, the storage device 430, and the input/output device 440 can be interconnected via a system bus 450. The processor 410 is capable of processing instructions for execution within the computing system 400. Such executed instructions can implement one or more components of, for example, the analytics engine 110. In some example embodiments, the processor 410 can be a single-threaded processor. Alternatively, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, a tape device, a solid-state device, and/or any other suitable persistent storage means. The input/output device 440 provides input/output operations for the computing system 400. In some example embodiments, the input/output device 440 includes a keyboard and/or pointing device. In various implementations, the input/output device 440 includes a display unit for displaying graphical user interfaces.

According to some example embodiments, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, analysis and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   identifying an activity pattern associated with a first clinician as being an infrequent activity pattern that occurs below a threshold frequency, wherein the infrequent activity pattern is identified based at least on a signal-to-noise ratio associated with the infrequent activity pattern being below a threshold value;
   determining, based at least on one or more data models, whether the infrequent activity pattern corresponds to an anomalous behavior;
   triggering an investigative workflow in response to the infrequent activity pattern being determined to correspond to the anomalous behavior; and
   causing a wasting station to provide a separate receptacle for unused medication from the first clinician, wherein the separate receptacle isolates the unused medication that the first clinician disposes of at the wasting station from a shared receptacle that comingles unused medication disposed by multiple clinicians.

2. The system of claim 1, wherein the activity pattern includes a plurality of transaction records generated in response to the first clinician interacting with one or more data systems, and wherein the one or more data systems include an access control system, a dispensing system, an infusion system, a compounding system, and/or an electronic medical record system.

3. The system of claim 2, wherein the plurality of transaction records include one or more transaction values corresponding to a timestamp, a patient identifier, a device identifier, a clinician identifier, a medication identifier, a prescription order identifier, an inventory information, a patient status, a shift identifier, a location tracking identifier, an infusion information, a compounding information, an administration information, a working off clock indicator, and/or an electronic health record identifier.

4. The system of claim 1, wherein the one or more data models are generated based on a series of transaction records known to be associated with one or more types of anomalous behavior that are indicative of diversion.

5. The system of claim 4, wherein each of the one or more data models include a combination of reference transaction values representative of a corresponding type of anomalous behavior, and wherein the combination of reference transaction values include one or more reference transaction values for the timestamp, the patient identifier, the device identifier, the clinician identifier, the medication identifier, the prescription order identifier, the inventory information, the patient status, the shift identifier, the location tracking identifier, the infusion information, the compounding information, the administration information, the working off clock indicator, and/or the electronic health record identifier.

6. The system of claim 1, wherein the anomalous behavior includes the first clinician routinely selecting a second clinician to witness a wasting of medication while the second clinician also serves as a witness for a third clinician wasting medication.

7. The system of claim 1, wherein the anomalous behavior includes the first clinician routinely selecting a second clinician to witness a wasting of medication and the second clinician routinely selecting the first clinician to witness the wasting of medication.

8. The system of claim 1, wherein the anomalous behavior includes the first clinician withdrawing a medication for a deceased patient and/or a discharged patient.

9. The system of claim 1, wherein the anomalous behavior includes the first clinician routinely accessing a medical management device within a threshold quantity of time after another clinician.

10. The system of claim 1, wherein the anomalous behavior includes a paired cancellation of transactions, an unexpected forced opening of a medication management device, a clinician interacting with the medication management device when the clinician not scheduled to work, the clinician interacting with the medication management device when the clinician is not clocked in to for work, and/or the clinician interacting with the medication management device at an abnormal time.

11. The system of claim 1, wherein the investigative workflow includes sending, to a client device, an alert indicating the first clinician as exhibiting the anomalous behavior.

12. The system of claim 1, wherein the investigative workflow includes activating one or more surveillance devices in response to the first clinician interacting with a medical management device and/or isolating a medication accessed by the first clinician.

13. The system of claim 1, wherein the infrequent activity pattern is determined to correspond to the anomalous behavior in response to a match between a first plurality of transaction values forming the infrequent activity pattern and a second plurality of reference transaction values included in a data model of the anomalous behavior being above a threshold value.

14. The system of claim 13, wherein the threshold value is adjusted in response to a misidentification of more than a threshold quantity of infrequent activity patterns.

15. A computer-implemented method, comprising:
identifying an activity pattern associated with a first clinician as being an infrequent activity pattern that occurs below a threshold frequency, wherein the infrequent activity pattern is identified based at least on a signal-to-noise ratio associated with the infrequent activity pattern being below a threshold value;
determining, based at least on one or more data models, whether the infrequent activity pattern corresponds to an anomalous behavior;
triggering an investigative workflow in response to the infrequent activity pattern being determined to correspond to the anomalous behavior; and
causing a wasting station to provide a separate receptacle for unused medication from the first clinician, wherein the separate receptacle isolates the unused medication that the first clinician disposes of at the wasting station from a shared receptacle that comingles unused medication disposed by multiple clinicians.

16. The method of claim 15, wherein the activity pattern includes a plurality of transaction records generated in response to the first clinician interacting with one or more data systems, and wherein the one or more data systems include an access control system, a dispensing system, an infusion system, a compounding system, and/or an electronic medical record system.

17. The method of claim 16, wherein the plurality of transaction records include one or more transaction values corresponding to a timestamp, a patient identifier, a device identifier, a clinician identifier, a medication identifier, a prescription order identifier, an inventory information, a patient status, a shift identifier, a location tracking identifier, an infusion information, a compounding information, an administration information, a working off clock indicator, and/or an electronic health record identifier.

18. The method of claim 15, wherein the one or more data models are generated based on a series of transaction records known to be associated with one or more types of anomalous behavior that are indicative of diversion.

19. The method of claim 18, wherein each of the one or more data models include a combination of reference transaction values representative of a corresponding type of anomalous behavior, and wherein the combination of reference transaction values include one or more reference transaction values for the timestamp, the patient identifier, the device identifier, the clinician identifier, the medication identifier, the prescription order identifier, the inventory information, the patient status, the shift identifier, the location tracking identifier, the infusion information, the compounding information, the administration information, the working off clock indicator, and/or the electronic health record identifier.

20. A non-transitory computer readable medium storing instructions, which when executed by at least one data processor, result in operations comprising:
identifying an activity pattern associated with a clinician as being an infrequent activity pattern that occurs below a threshold frequency, wherein the infrequent activity pattern is identified based at least on a signal-to-noise ratio associated with the infrequent activity pattern being below a threshold value;

determining, based at least on one or more data models, whether the infrequent activity pattern corresponds to an anomalous behavior;

triggering an investigative workflow in response to the infrequent activity pattern being determined to correspond to the anomalous behavior; and causing a wasting station to provide a separate receptacle for unused medication from the first clinician, wherein the separate receptacle isolates the unused medication that the first clinician disposes of at the wasting station from a shared receptacle that comingles unused medication disposed by multiple clinicians.

* * * * *